United States Patent
Reddix et al.

(10) Patent No.: US 11,976,640 B2
(45) Date of Patent: May 7, 2024

(54) SHAPE MEMORY ALLOY WIRE ACTUATED DEVICE

(71) Applicant: Ensign-Bickford Aerospace & Defense Company, Simsbury, CT (US)

(72) Inventors: Zachary D. Reddix, East Hartford, CT (US); Andrew M. Kochanek, Suffield, CT (US); Michael Barglowski, Simsbury, CT (US); Robert Morlath, Cheshire, CT (US); Luis E. Macias, Dublin, CA (US)

(73) Assignee: Ensign-Bickford Aerospace & Defense Company, Simsbury, CT (US)

( * ) Notice: Subject to any disclaimer, the term of this patent is extended or adjusted under 35 U.S.C. 154(b) by 27 days.

(21) Appl. No.: 17/719,981

(22) Filed: Apr. 13, 2022

(65) Prior Publication Data

US 2022/0364551 A1 Nov. 17, 2022

Related U.S. Application Data

(60) Provisional application No. 63/189,355, filed on May 17, 2021.

(51) Int. Cl.
*F03G 7/06* (2006.01)
*H02N 10/00* (2006.01)

(52) U.S. Cl.
CPC ........... *F03G 7/0614* (2021.08); *H02N 10/00* (2013.01)

(58) Field of Classification Search
CPC .............................. F03G 7/0614; H02N 10/00
See application file for complete search history.

(56) References Cited

U.S. PATENT DOCUMENTS

| | | | |
|---|---|---|---|
| 2,620,815 A | 12/1952 | Margraf et al. |
| 3,620,237 A | 11/1971 | Sindall et al. |
| 3,722,596 A | 3/1973 | Livingston |
| 3,759,282 A | 9/1973 | Kaldenback et al. |
| 3,924,688 A | 12/1975 | Cooper et al. |
| 5,471,888 A | 12/1995 | McCormick |
| 7,635,004 B2 | 12/2009 | Rudoy et al. |
| 8,661,818 B2 | 3/2014 | Nakamura et al. |
| 2007/0028964 A1 | 2/2007 | Vasquez et al. |
| 2011/0175474 A1 | 7/2011 | Brown et al. |

(Continued)

OTHER PUBLICATIONS

International Search Report and Written Opinion for Application No. PCT/US2022/072164, dated Feb. 1, 2023, 10 pages.

*Primary Examiner* — Shafiq Mian
(74) *Attorney, Agent, or Firm* — McCarter & English, LLP; Dave S. Christensen

(57) ABSTRACT

An actuator, a release device, and a method of actuating a release device are provided. The actuator comprises a housing defining a first path; an actuating element disposed within the first path, the actuating element being made from a shape memory alloy having a transition temperature, the actuating element being configured to couple with a power source, at least portion of the actuating element being further configured to not change shape when the power source applies a first current for a predetermined amount of time and moves at least a portion of the actuating element from the first position to a second position when the power source applies a second current; and a heat transfer material disposed in the first path between the actuating element and the housing.

20 Claims, 3 Drawing Sheets

(56) References Cited

U.S. PATENT DOCUMENTS

| | | | |
|---|---|---|---|
| 2012/0048839 A1 | 3/2012 | Leary et al. | |
| 2012/0276807 A1* | 11/2012 | Cabrera | A63H 13/00 |
| | | | 60/527 |
| 2013/0160445 A1* | 6/2013 | Olson | F03G 7/065 |
| | | | 60/527 |
| 2014/0030036 A1* | 1/2014 | Lopez | B26D 3/11 |
| | | | 408/204 |
| 2015/0330371 A1* | 11/2015 | Ac | F03G 7/065 |
| | | | 60/527 |
| 2016/0307718 A1* | 10/2016 | Geier | H01H 37/323 |
| 2019/0348240 A1 | 11/2019 | Priest et al. | |
| 2021/0062795 A1* | 3/2021 | Tanabe | G06F 3/016 |

* cited by examiner

SHAPE MEMORY ALLOY WIRE ACTUATED DEVICE

CROSS REFERENCE TO RELATED APPLICATIONS

This application claims the benefit of U.S. Provisional Application Ser. No. 63/189,355, filed May 17, 2021, the entire disclosure of which is incorporated herein by reference.

BACKGROUND

The subject matter disclosed herein relates to an actuator having a shape memory alloy, and in particular to an actuator having passive thermal management.

Release devices are used in variety of applications, such as aerospace or underwater applications that involve the deployment of payloads from space vehicles, the securing and arming of ordinance, the release of emergency hatches, and the recovery of instrument packages from oceanographic equipment or from underwater vehicles for example.

It should be appreciated that for each of these applications, it is desired that the release device be of high reliability and avoid actuation except at the desired the time. Since these applications may involve challenging environmental conditions, the devices may be subject to testing, such as a thermal test where the device is subject to a condition and not actuate. This helps provide reassurance that device may be used in the application and will function properly.

Typically release devices of this type include a cartridge actuated pyrotechnic device that separates a frangible joint. The device can include separation nuts, explosive bolts, bold cutters, and pin puller mechanisms. Burn-wire type devices have also been produced that include tensile release elements and spring loaded pin pullers. Further devices that are actuated using paraffin have been used with pin puller mechanisms.

It is recognized that each of these release devices, while being highly reliable and used in service for many years, have some short comings. For example, the pyrotechnic devices produce large forces that the structure needs to be able to manage. Further, pyrotechnic devices are a single use device. Burn-wire devices utilize a fuse that removes the issues involving large forces, but may be only used on relatively small loads and further the device needs to be reloaded with an initiator after each use. Finally, the paraffin actuators may be repeated used but are large, expensive and are slow to operate.

Accordingly, while existing release devices are suitable for their intended purposes the need for improvement remains, particularly in providing a high reliability release device having the features described herein.

BRIEF DESCRIPTION

According to one aspect of the disclosure an actuator for a release mechanism. The actuator comprises a housing defining a first path; an actuating element disposed within the first path, the actuating element being made from a shape memory alloy having a transition temperature, the actuating element being configured to couple with a power source, at least portion of the actuating element being further configured to not change shape when the power source applies a first current for a predetermined amount of time and moves at least a portion of the actuating element from the first position to a second position when the power source applies a second current; and a heat transfer material disposed in the first path between the actuating element and the housing.

In addition to one or more of the features described herein above, or as an alternative, further embodiments of the actuator may include a heat sink thermally coupled to the housing, the heat sink being in thermal communication with the actuating element.

In addition to one or more of the features described herein above, or as an alternative, further embodiments of the actuator may include the heat transfer material being a thermal grease. In addition to one or more of the features described herein above, or as an alternative, further embodiments of the actuator may include the thermal grease being a silicone based material.

In addition to one or more of the features described herein above, or as an alternative, further embodiments of the actuator may include the actuating element being an elongated member.

In addition to one or more of the features described herein above, or as an alternative, further embodiments of the actuator may include the shape memory alloy being a nickel titanium alloy.

In addition to one or more of the features described herein above, or as an alternative, further embodiments of the actuator may include the movement of the at least a portion being configured to activate the release device.

According to another aspect of the disclosure a release device is provided. The release device comprises: a release mechanism configured to move a latch in a direction operable to release a retaining element in an assembly; a housing operably coupled to the release mechanism, the housing defining a first path; an elongated actuating element having a first portion operably coupled to the housing and a second portion operably coupled to the latch, the actuating element being disposed in the first path, the actuating element being made from a shape memory alloy have a transition temperature, the actuating element does not substantially change shape when a first current is applied to the elongated actuating element for a predetermined amount of time, and from the first size to a second size when a second current is applied to the elongated actuating element, the actuating moving the latch to release the retaining element at the second size; and a heat transfer material disposed between the housing the actuating element.

In addition to one or more of the features described herein above, or as an alternative, further embodiments of the release device may include a heat sink thermally coupled to the housing, the heat sink being in thermal communication with the actuating element.

In addition to one or more of the features described herein above, or as an alternative, further embodiments of the release device may include the heat transfer material being thermal grease. In addition to one or more of the features described herein above, or as an alternative, further embodiments of the release device may include the thermal grease being a silicone based material.

In addition to one or more of the features described herein above, or as an alternative, further embodiments of the release device may include the actuating element being a 15 mil wire.

In addition to one or more of the features described herein above, or as an alternative, further embodiments of the release device may include the shape memory allow being a nickel titanium alloy.

In addition to one or more of the features described herein above, or as an alternative, further embodiments of the release device may include the first current being one Amp and the predetermined amount of time being five minutes.

In addition to one or more of the features described herein above, or as an alternative, further embodiments of the release device may include the releasing of the retaining element being configured to remove an inhibition function of the assembly.

In addition to one or more of the features described herein above, or as an alternative, further embodiments of the release device may include the retaining element being operably coupled to one of a lock, a switch, a cutout, a payload deployment assembly of a space vehicle, an assembly for securing and arming of ordinance, the release assembly of an emergency hatch, a recovery assembly for instrument packages on an oceanographic equipment or from an underwater vehicles.

According to yet another aspect of the disclosure a method of actuating a release device is provided. The method comprising: applying a first electrical current to an actuating element, the actuating element being made from a shape memory alloy having a transition temperature; conducting heat from the actuating element to a housing via a heat transfer material, the heat transfer material being disposed between the actuating element and the housing, the heat transfer material and housing cooperating to maintain a temperature of the actuating element below the transition temperature when the first electrical current is applied for the predetermined amount of time; applying a second electrical current to the actuating element; and changing the size of the actuating element to activate the release device when the second electrical current is applied to the actuating element.

In addition to one or more of the features described herein above, or as an alternative, further embodiments of the method may include conducting heat from the housing to a heat sink, wherein the heat transfer material, housing, and heat sink cooperate to maintain the temperature of the actuating element below the transition temperature when the first electrical current is applied for the first predetermined amount of time.

In addition to one or more of the features described herein above, or as an alternative, further embodiments of the method may include the first electrical current being one amp and the predetermined time is equal to or greater than five minutes, the second electrical current being greater than the first electrical current.

In addition to one or more of the features described herein above, or as an alternative, further embodiments of the method may include the heat transfer material being a thermal grease.

In addition to one or more of the features described herein above, or as an alternative, further embodiments of the method may include removing an inhibition function of an assembly in response to activating the release device.

In addition to one or more of the features described herein above, or as an alternative, further embodiments of the method may include the release device being operably coupled to one of a lock, a switch, a cutout, a payload deployment assembly of a space vehicle, an assembly for securing and arming of ordinance, the release assembly of an emergency hatch, a recovery assembly for instrument packages on an oceanographic equipment or from an underwater vehicles.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for an actuating device that utilizes a shape-memory alloy. The actuating device provides advantages in not actuating a release mechanism at a predetermined first current for a predetermined period of time. The actuating device provides further advantages in actuating the release mechanism at a predetermined second electrical current.

In some applications, such as aerospace applications for example, it is desired to have an actuator that will activate only under a desired condition, such when a threshold energy level is exceeded. As discussed further herein, due to the challenging environment in which the actuator operates (e.g. releasing a satellite in space or deploying a fin on a missile), the actuator may be inadvertently subjected to low energy events (i.e. energy levels below the activation threshold). Accordingly, embodiments of the present disclosure provide for a controlled heat path that allows the actuator to activate in a high energy event (above a threshold) and not active in a low energy event.

Figure 1A:
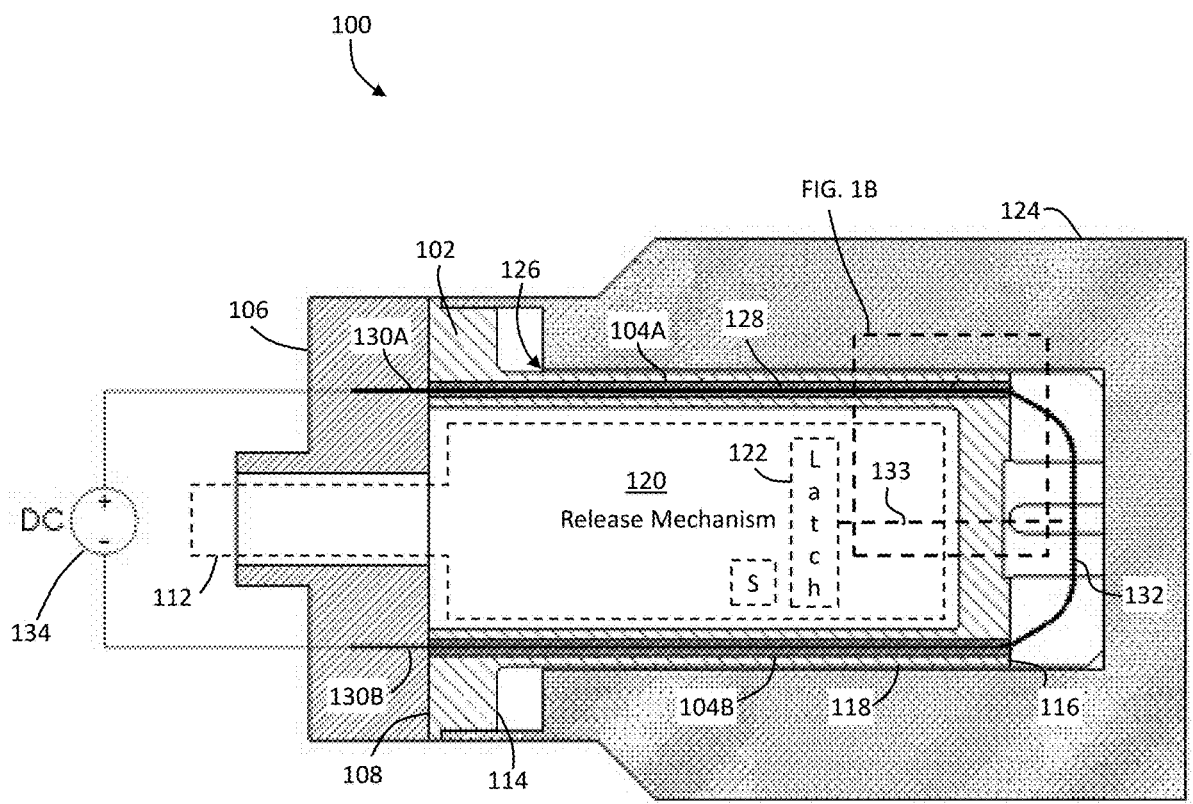
FIG. 1A is a sectional view of a release device in accordance with an embodiment.

Referring now to FIG. 1A, an embodiment is shown of a release device 100. The release device 100 may be used in a variety of applications, including, but not limited to deployment of payloads from space vehicles, the securing and arming of ordinance, the release of emergency hatches, the release of a fin on a missile, and the recovery of instrument packages from oceanographic equipment or from underwater vehicles for example. In further embodiments, the release device 100 may be used to allow other functions of the application to operator. For example, the release device 100 may remove an inhibition function of an assembly or subsystem, such as the releasing of a safety switch, a cutout, or a lock that allows another assembly to operate. In an embodiment, the release device is activated at a predetermined point in a operation timeline to allow the device in which it is coupled to perform a function. It should be appreciated that while embodiments herein may illustrate the release device 100 as being a pin-puller type of device, this is for example purposes and the claims should not be so limited. In other embodiments the actuating and heat transfer features described herein may be utilized in other devices having different mechanisms without deviating from the scope or spirit of the claims herein.

The device 100 includes a housing 102 having a pair of bores, slots or passages 104A, 104B extending therethrough. The passages 104A, 104B define a path through the housing 102. An end cap 106 is coupled to an end 108 of the housing 102. In an embodiment, the end cap 106 includes an opening 110 that allows a pin 112 to extend therethrough. The end cap 106 may include flanges or one or more bolt-holes that allow the device 100 to be mounted to a system.

The housing 102 further includes a flange portion 114 at the end 108 and an opposing end wall 116 with a side wall 118 extending therebetween. In an embodiment, the side wall 118 and end wall 116 define an interior space sized to receive a release mechanism 120. As discussed herein, the release mechanism includes a latch 122 that selectively actuates the release mechanism to move the pin 112.

Disposed about the housing 102 is a heat sink 124. The heat sink 124 is in thermal communication with the housing 102 and configured to passively or actively conduct heat from the housing 102. In some embodiments, the heat sink 124 is coupled to the housing 102 to allow heat transfer therebetween. In some embodiments, the heat sink 124 may be made from a thermally conductive metallic, nonmetalic or composite material, such as but not limited to 1050A, 6060, 6063 or 6065 Aluminum alloys, copper, diamond, copper-tungsten pseudoalloy, silicon carbide in aluminum matrix (AlSiC), diamond copper-silver alloy (Dymalloy), beryllium oxide in beryllium matrix for example. In an embodiment, the heat sink 124 is press fit onto the housing 102. In another embodiment, the side wall 118 of the housing 102 is coated with a thermal grease and the heat sink 124 is press fit onto the housing 102. In still another embodiment, there is a clearance fit between the side wall 118 and an internal diameter 126 of the heat sink 124. In this embodiment, the gap between the heat sink 124 and the side wall 188 is filled with a thermal grease.

As used herein, a thermal grease is a thermally conductive material that forms an interface to allow thermal communication therebetween. The thermal grease may be any suitable compound, including but not limited a polymerizable liquid matrix with a thermally conductive filler. Typical matrix materials include silicone, epoxy, urethane and acrylates for example. Typical filler materials include aluminum oxide, boron nitride, zinc oxide and aluminum nitride for example. In some embodiments the thermal grease or paste may be made from a non-silicone based material. In still other embodiments any suitable material that facilitates conduction may be used. In an embodiment, the thermal grease is model SG-60NS thermal compound manufactured by Fujipoly America of Carteret, New Jersey, USA.

The device 100 further includes an actuator element 128. The actuator element 128 includes a first leg 130A, a second leg 130B, and a end portion 132. In the illustrated embodiment, the actuator element 128 is an elongated wire that is between 10-15 mils in diameter. The legs 130A, 130B are disposed within the passages 104A, 104B respectively. In the illustrated embodiment, the legs 130A, 130B are fixed to the housing 102 or the end cap 106, such as at, or adjacent to the end 108. The end portion 132 is operably coupled 133 to the latch 122 of release device 120. The actuator element 128 is made from a shape-memory alloy (SMA), such as nickel titanium (Nitinol™) alloy for example, with a known trigger or transition temperature at which the material moves or shrinks. Other suitable shape-memory alloys include, but are not limited to CuAlNi and TiNiPd alloy materials for example. The shape-memory materials are characterized in being easily deformed when cold (below the transition temperature) with shape recovery (e.g. about 3%) when heated to the transition temperature.

The actuator element 128 is coupled to a power source 134 that selectively flows electrical current through the actuator element 128. It should be appreciated that the flowing of current through the actuator element 128 will generate heat due to the resistance ($I^2R$ effect) of the actuator element 128 causing the temperature of the actuator element 128 to increase. Heating the actuator element 128 to its transition temperature causes it to recover from a lower temperature shape towards a memory shape. When the actuator element 128 reaches the transition temperature of the shape-memory alloy material, the actuator element 128 will recover toward the memory shape by contracting or moving the end portion 132 from a first position to a second position (e.g. a stroke distance). As a result, the movement of the end portion 132 releases the latch 122, allowing the release mechanism 120 to move the pin 112.

When the electric current is removed (e.g. the circuit is opened), the actuating element temperature reduces below the transition temperature and the actuator element 128 may be returned to the locked position. In an embodiment, the release mechanism includes a biasing means, such as a spring, that applies a force against the latch 122 to reset the actuator element 128 back to its low temperature shape. In an embodiment, the device 100 may be reset by applying, either manually or automatically, a sufficient counterforce against the pin 112 to compress the release mechanism.

In an embodiment, the actuating element 128 provides a predetermined amount of work which is based on volume size. The work output is defined as the actuator force times the recovery stroke of wire. The amount of force expected from the actuator element 128 can be calculated based on the maximum allowable stress. In an embodiment, the maximum allowable stress is 30,000 lb/in$^2$.

In some embodiments, it is desired for the device 100 to be subject to predetermined conditions, such as ambient temperature and an electrical current for example, and not operate (e.g. release the latch 122). For example, in some applications it is desired for the device 100 to not operate when subjected to a 1 Amp for a predetermined time of 5 minutes at an ambient temperature of 71 C without active cooling. As a result, it should be appreciated that it is desirable to control the heat transfer from the actuator element 128 to avoid an undesired operation of the device 100.

Figure 1B:
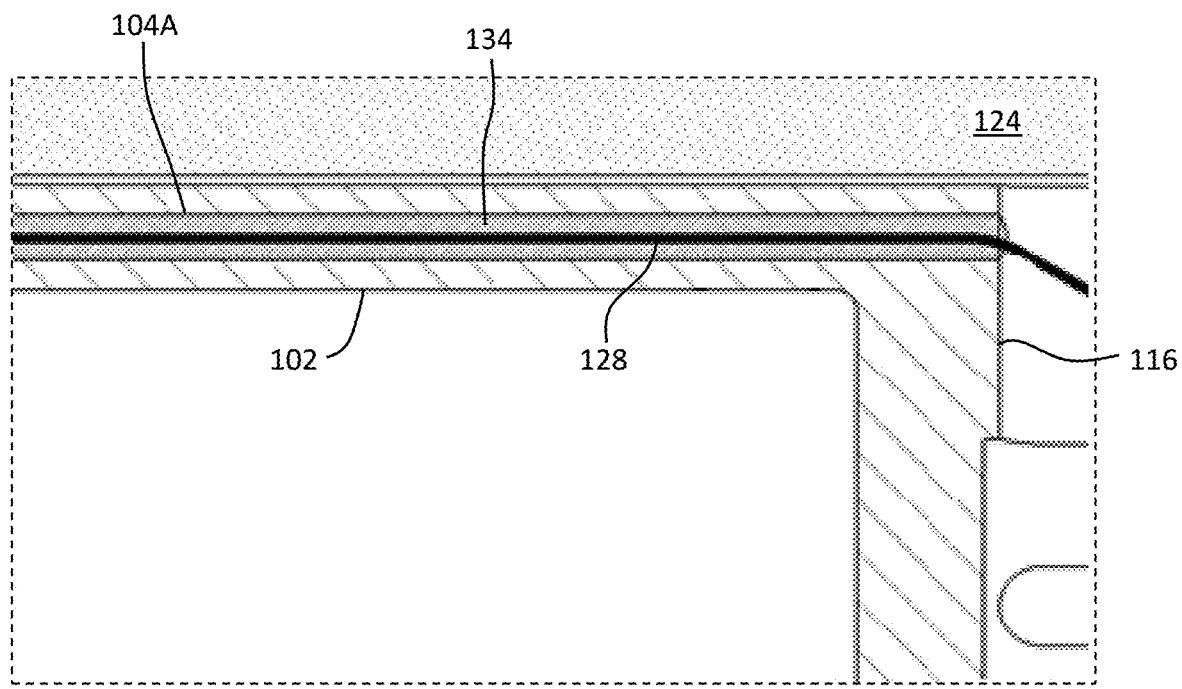
FIG. 1B is an enlarged view of a portion of the release device of FIG. 1A.

In an embodiment, the device 100 further includes a heat transfer material, such as a thermal grease 134 (FIG. 1B), disposed in the passages 104A, 104B. The thermal grease 134 substantially fills the passages 104A, 104B and is substantially disposed between the actuator element 128 and the housing 102. It should be appreciated that the thermal grease 134 allows for thermal communication between the actuator element 128 and the housing 102. Since the housing 102 is in thermal communication with the heat sink 124, the actuator element 128 is in thermal communication (i.e. conduction) with the heat sink 124. As a result, the thermal energy of the actuator element 128 resulting from an electrical current may be transferred to the environment. It should be appreciated that in prior art systems the actuator element was simply placed within a passage, thus the heat transfer characteristics were based on how often and the location where the actuator element contacted/touched the wall of the passage within the housing 102. Since this contact would vary from device to device, the heat transfer characteristics were inconsistent. It has been found that the use of the thermal grease 134 allows for a controlled heat path that allows the release device 100 to be operated reliably in at least two modes of operation.

A prior art pin-puller device using a shape-memory alloy was tested using a 50 millisecond threshold for operating (at room temperature). This group of prior art devices operated in less than 50 milliseconds at an average electrical current of 4.351 Amps. These prior art devices, when subjected to a low current for five minutes at room temperature, operated at 5 minutes at an average current of 0.647 Amps. It should be appreciated that an elevated ambient temperature (e.g. 71 C) would further reduce this operating electrical current.

The device 100 was subjected to the same test at an ambient temperature of 71 C, with the heat sink 124 having a 0.25 inch thick wall press fit with thermal grease onto the housing 102. The aforementioned model SG-60NS thermal grease was used for the thermal grease 134 between the housing 102 and the heat sink 124. In this test, the actuator element 128 was made from 15 mil Nitinol wire. When the device 100 was tested, the average five minute operating current was 1.62 Amps. In this embodiment, the device 100 operated at less than 50 milliseconds at an average electrical current of 14.20 Amps.

Depending on the application and testing conditions, it has been found that the wire gauge, thermal grease, and heat sink mass may be varied to provide a desired operating electrical current after a predetermined time.

Figure 2:
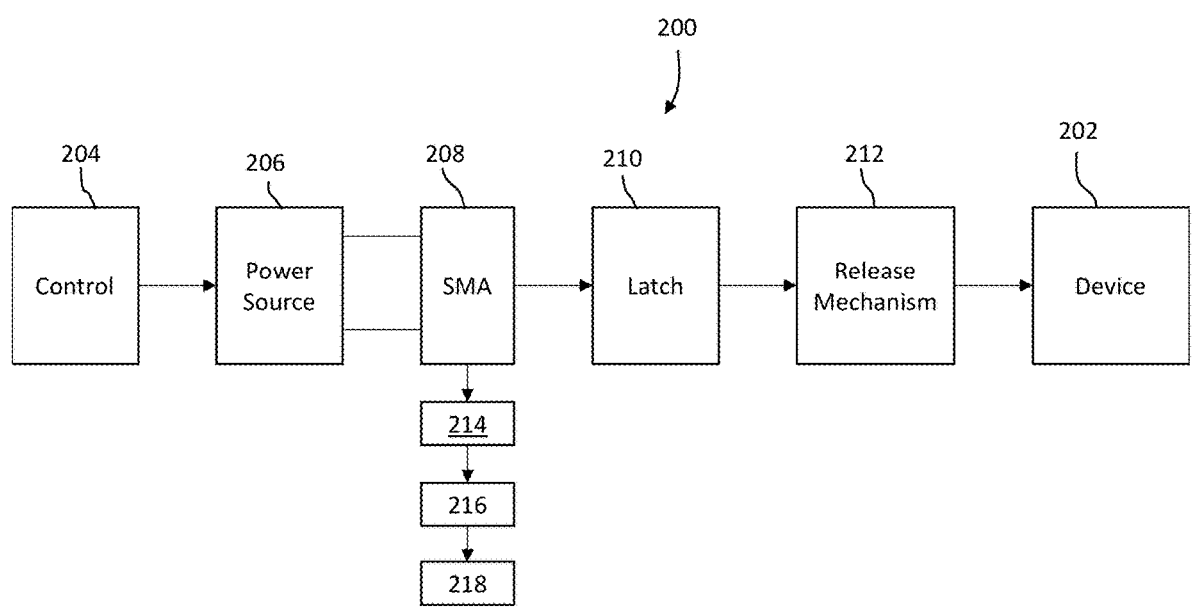
FIG. 2 is a schematic illustration of a system for releasing a device.

Referring now to FIG. 2, an embodiment is shown of a system 200 for releasing a device 202, such as by moving a pin for example. The system 200 may be an aerospace device, such as a satellite deployment system or a missile for example. In this embodiment, the system 200 includes a control device 204 that is configured to cause a power source 206 to flow electrical current. The control device 204 may be an analog or a digital control device. In an embodiment, the controller 204 may close a switch that electrically connects the power source 206 to the actuating element 208. In an embodiment, the actuating element 208 is the same or similar to the actuating element 128 and is made from a shape-memory alloy.

In response to the flowing of electrical current above a predetermined threshold that is sufficient to heat the actuating element 208 to the transition temperature, the actuating element 208 will change shape and release a latch 210. The releasing of the latch 210 allows movement of a release mechanism 212, such as the movement of a pin (e.g. pin 112). The movement of the release mechanism 212 disengages the release mechanism 212 from the device 202.

In an embodiment, the actuating element 208 is in thermal communication (e.g. conduction) with a heat transfer material, such as a thermal grease 214. The thermal grease 214 is further in thermal communication (e.g. conduction) with a housing 216. The housing 216 in turn is in thermal communication (e.g. conduction) with a heat sink 218. In some embodiments, the heat sink 218 is integral with the housing 216. The thermal grease 214, the housing 216 and the heat sink 218 cooperate to transfer heat or thermal energy from the actuating element 208 in a controlled and reliable manner. In an embodiment, the thermal grease 214, the housing 216 and the heat sink 218 cooperate to maintain the actuating element 208 below the transition temperature of the actuating element 208 for a predetermined amount of time for a current input from the power source 206 that is below a predetermined threshold. In an embodiment, the actuating element 208 will not activate the latch 210 when an electrical current of less than or equal to 1 Amp flows from the power source 206 for a period of five minutes. In an embodiment, the release current threshold for activating the actuating element 208 is an electrical current that is above a lower current threshold and generates a sufficient amount heat/thermal-energy to cause the actuating element to move from a first position to a second position in a predetermined amount of time. In an embodiment, the release current allows the activating of the release device in less than 50 milliseconds. In an embodiment, the release current threshold was greater than 4 amps. It should be appreciated that in other embodiments, other combinations of electrical current and time periods may be used.

It should be appreciated that while embodiments described herein may be described with respect to a particular shape or a particular wire diameter, this is for example purposes and the claims should not be so limited. The thermal transfer/heat-sink methods described herein may be used with SMA components of different shapes without deviating from the teachings herein.

The term "about" is intended to include the degree of error associated with measurement of the particular quantity based upon the equipment available at the time of filing the application.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An actuator for a release mechanism, the actuator comprising:
    a housing defining a first path;
    an actuating element disposed within the first path, the actuating element being made from a shape memory alloy having a transition temperature, the actuating element being configured to couple with a power source, at least portion of the actuating element being further configured to not change shape when the power source applies a first current for a predetermined amount of time and moves at least a portion of the actuating element from the first position to a second position when the power source applies a second current; and
a heat transfer material disposed in the first path between the actuating element and the housing, wherein the heat transfer material is thermal grease.

2. The actuator of claim 1, further comprising a heat sink thermally coupled to the housing, the heat sink being in thermal communication with the actuating element.

3. The actuator of claim 1, wherein the thermal grease is a silicone based material.

4. The actuator of claim 1, wherein the actuating element is an elongated member.

5. The actuator of claim 1, wherein the shape memory alloy is a nickel titanium alloy.

6. The actuator of claim 1, wherein movement of the at least a portion is configured to activate the release device.

7. A release device comprising:
a release mechanism configured to move a latch in a direction operable to release a retaining element in an assembly;
a housing operably coupled to the release mechanism, the housing defining a first path;
an elongated actuating element having a first portion operably coupled to the housing and a second portion operably coupled to the latch, the actuating element being disposed in the first path, the actuating element being made from a shape memory alloy have a transition temperature, the actuating element does not substantially change shape when a first current is applied to the elongated actuating element for a predetermined amount of time, and from the first size to a second size when a second current is applied to the elongated actuating element, the actuating moving the latch to release the retaining element at the second size; and
a heat transfer material disposed between the housing and the actuating element.

8. The release device of claim 7, further comprising a heat sink thermally coupled to the housing, the heat sink being in thermal communication with the actuating element.

9. The release device of claim 7, wherein the heat transfer material is thermal grease.

10. The release device of claim 9, wherein the thermal grease is a silicone based material.

11. The release device of claim 7, wherein the actuating element is a 15 mil wire.

12. The release device of claim 7, wherein the shape memory alloy is a nickel titanium alloy.

13. The release device of claim 7, wherein the first current is one Amp and the predetermined amount of time is five minutes.

14. The release device of claim 7, wherein the releasing of the retaining element is configured to remove an inhibition function of the assembly.

15. The release device of claim 7, wherein the retaining element is operably coupled to one of a lock, a switch, a cutout, a payload deployment assembly of a space vehicle, an assembly for securing and arming of ordinance, the release assembly of an emergency hatch, a recovery assembly for instrument packages on an oceanographic equipment or from an underwater vehicles.

16. A method of actuating a release device, the method comprising:
applying a first electrical current to an actuating element, the actuating element being made from a shape memory alloy having a transition temperature;
conducting heat from the actuating element to a housing via a heat transfer material, the heat transfer material being disposed between the actuating element and the housing, the heat transfer material and housing cooperating to maintain a temperature of the actuating element below the transition temperature when the first electrical current is applied for the predetermined amount of time, wherein the heat transfer material is a thermal grease;
conducting heat from the housing to a heat sink, wherein the heat transfer material, housing, and heat sink cooperate to maintain the temperature of the actuating element below the transition temperature when the first electrical current is applied for the first predetermined amount of time
applying a second electrical current to the actuating element; and
changing the size of the actuating element to activate the release device when the second electrical current is applied to the actuating element.

17. The method of claim 16, further comprising conducting heat from the housing to a heat sink, wherein the heat transfer material, housing, and heat sink cooperate to maintain the temperature of the actuating element below the transition temperature when the first electrical current is applied for the first predetermined amount of time.

18. The method of claim 16, wherein the first electrical current is one amp and the predetermined time is equal to or greater than five minutes, the second electrical current being greater than the first electrical current.

19. The method of claim 16, further comprising removing an inhibition function of an assembly in response to activating the release device.

20. The method of claim 16, wherein the release device is operably coupled to one of a lock, a switch, a cutout, a payload deployment assembly of a space vehicle, an assembly for securing and arming of ordinance, the release assembly of an emergency hatch, a recovery assembly for instrument packages on an oceanographic equipment or from an underwater vehicles.

* * * * *